Sept. 7, 1965

E. I. JONSSON

3,204,706

AUTOMATIC FEEDING DEVICE FOR ROCK DRILLS

Filed Nov. 7, 1962

INVENTOR.
EMIL INGEMAR JONSSON
BY
ATTORNEY

Sept. 7, 1965  E. I. JONSSON  3,204,706
AUTOMATIC FEEDING DEVICE FOR ROCK DRILLS
Filed Nov. 7, 1962  5 Sheets-Sheet 3

INVENTOR.
EMIL INGEMAR JONSSON
BY
ATTORNEY

Sept. 7, 1965 E. I. JONSSON 3,204,706
AUTOMATIC FEEDING DEVICE FOR ROCK DRILLS
Filed Nov. 7, 1962 5 Sheets-Sheet 4

INVENTOR.
EMIL INGEMAR JONSSON
BY
ATTORNEY

United States Patent Office 3,204,706
Patented Sept. 7, 1965

1

3,204,706
AUTOMATIC FEEDING DEVICE FOR
ROCK DRILLS
Emil Ingemar Jonsson, Lycksele, Sweden, assignor to
Atlas Copco Aktiebolag, Nacka, Sweden, a corporation of Sweden
Filed Nov. 7, 1962, Ser. No. 235,961
15 Claims. (Cl. 173—10)

This invention relates generally to feeding devices for rock drills movable by power in the forward and backward direction along a guiding shell and more specifically to an automatized feeding device of this character for automatically producing drill holes of a predetermined depth.

One object of the invention is to provide an automatic feeding device for rock drills capable of feeding the rock drill from a rear position on the shell to a predetermined adjustable forward position thereon and of automatically returning the rock drill from said forward position to said rear position.

Another object of the invention is to provide an automatic feeding device of the above character in which the commencement of the forward feed is automatically accompanied with the forward extension of a drill steel centralizer while the end of the backward feed is accompanied with automatic retraction of said centralizer.

A further object of the invention is to provide a pressure fluid driven feeding device of the above character in which for simplification of the pressure fluid control there are provided two separate feeding motors preferably of the reciprocating diaphragm motor type, one for the forward feed and another for the backward feed.

A still further object of the invention is to provide an automatic feeding device for rock drills in which a feeding motor mechanism and a rock drill are interconnected to form a unit for common movement in forward and backward direction along the guiding shell, said unit carrying all the valves necessary for the automatic control of the movement of the unit.

The above and other objects of the invention will become obvious from the following description and from the accompanying drawings in which an embodiment of the invention is illustrated by way of example. It should be understood that this embodiment is only illustrative of the invention, and that various modifications may be made within the scope of the claims without departing from the scope of the invention.

In the drawings, wherein like numerals are employed to designate like parts.

2

Figures 5, 6, 7:
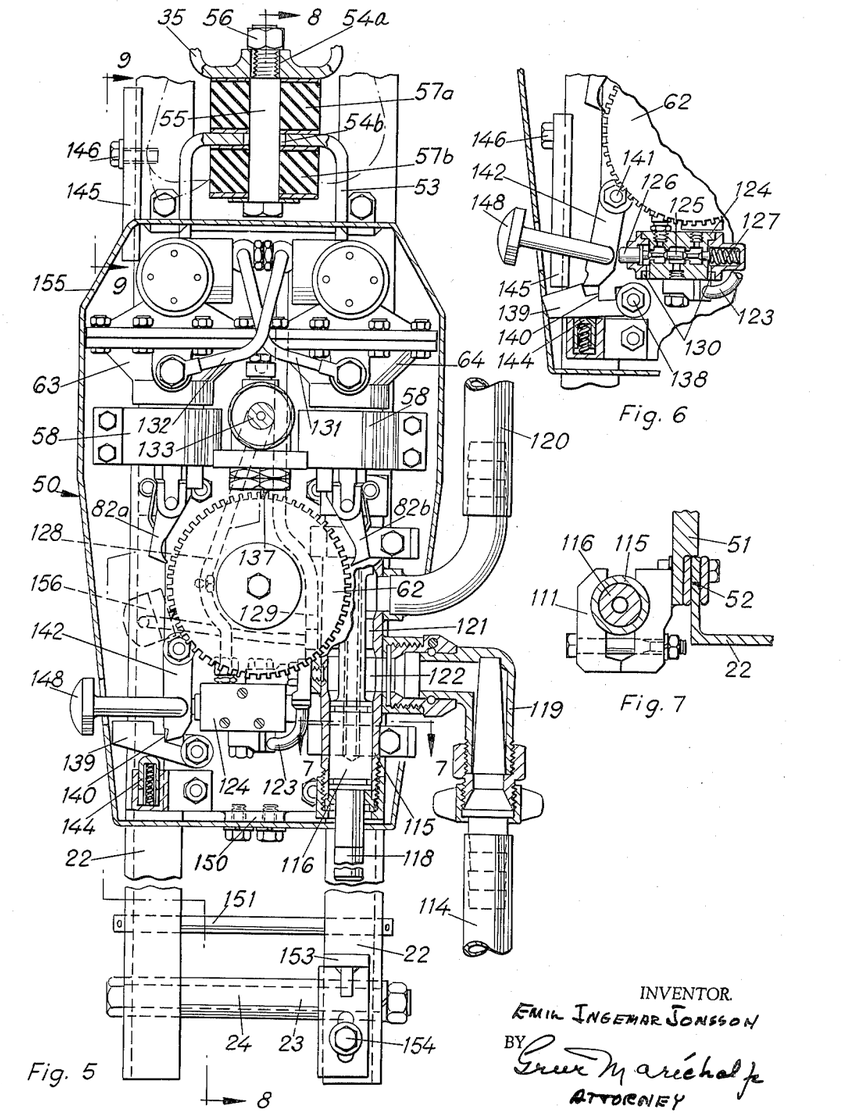
FIG. 5 is an enlarged sectional view substantially on line 5—5 in FIG. 1.
FIG. 6 shows a fragmentary portion of FIG. 5 and illustrates another position of the parts involved.
FIG. 7 is a fragmentary sectional view on line 7—7 in FIG. 5.
Figure 8:
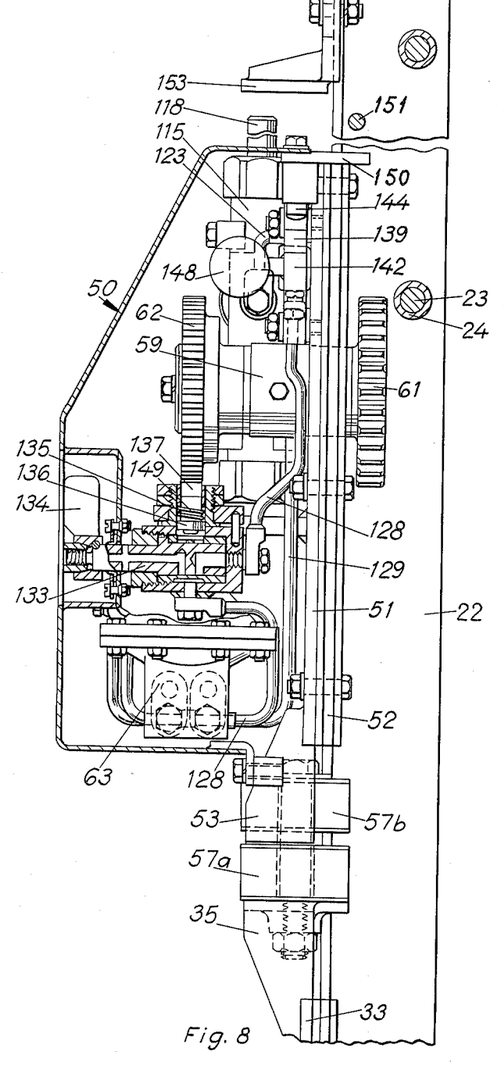
FIG. 8 is a sectional view substantially on line 8—8 in FIG. 5.
Figure 9:
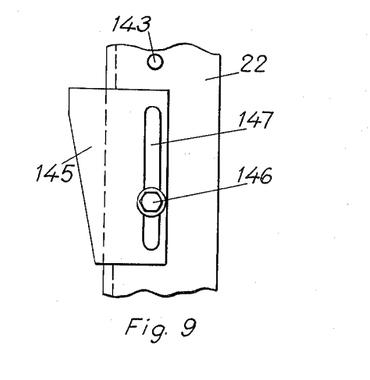
FIG. 9 is a view on line 9—9 in FIG. 5.
Figure 10:
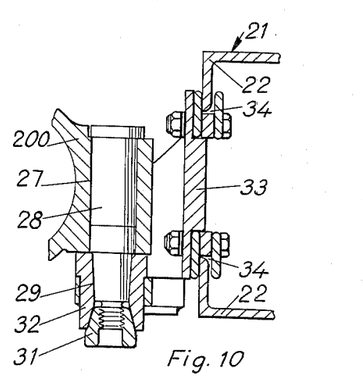
FIG. 10 is an enlarged view on line 10—10 in FIG. 1.
Figure 12:
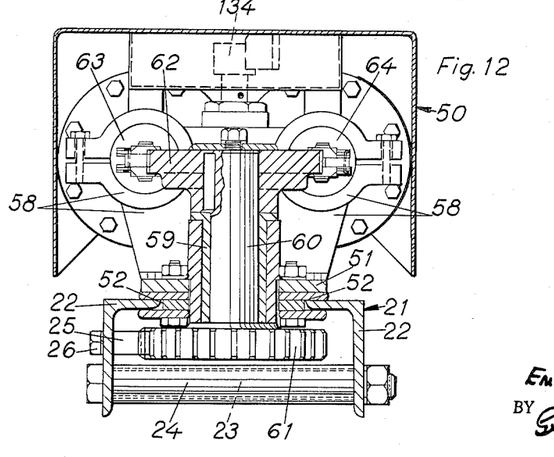
FIG. 12 is an enlarged sectional view substantially on line 12—12 in FIG. 1.

Referring to the drawings, a rock drill 200 of the percussive compressed air driven type is slidably mounted on a shell 21. The shell 21 preferably consists of parallel angle irons 22 extending in spaced-apart relation and united at spaced intervals by means of bolts 23 and nuts with the bolts extending through spacing tubes 24, FIG. 12. One of the angle irons carries at the inside a rack 25 extending longitudinally of the shell 21 and connected thereto as by bolts 26. The rock drill 200 is provided with a transverse through bore 27 and is carried by a supporting bolt 28 inserted in said bore. By means of a nut 31 threadedly secured to one end of the bolt 28 a conical intermediate portion 29 on the bolt may be brought in firm engagement with a corresponding conical surface provided in the head portion of a bracket 32 carried on a slide 33. The slide 33 is provided with longitudinal guideways 34 slidably arranged on the angle irons 22. A U-shaped bracket 35, FIGS. 5 and 8, extends to the rear from the slide 33.

Figures 1, 2:
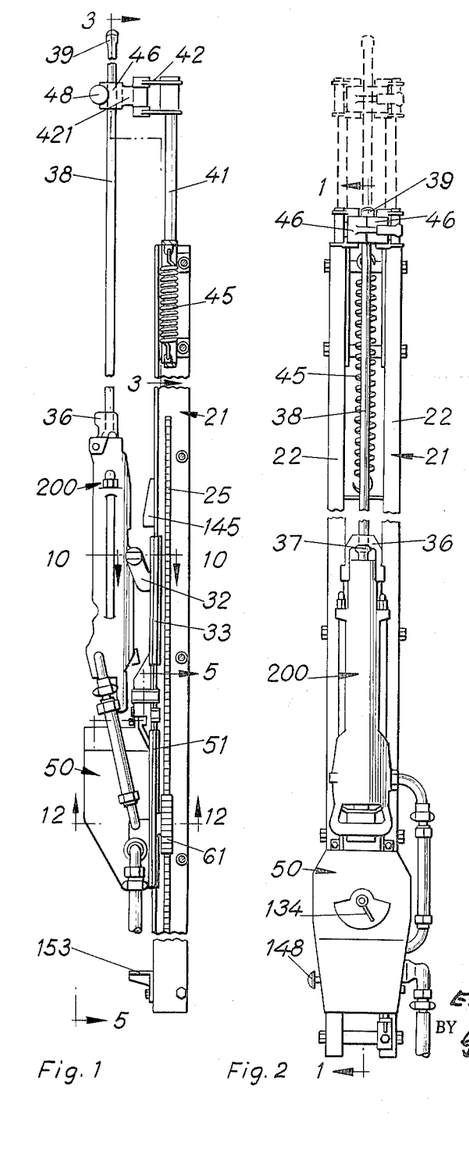
FIG. 1 is a partly sectional fragmentary side view shown in vertical position of the normally horizontal feeding device according to the invention, with the sectioned portion of the shell seen on line 1—1 in FIG. 2.
FIG. 2 is a fragmentary top view of the feeding device in FIG. 1 with the drilling unit in its rear position.

The rock drill 200 carries pivotally at its front end a retainer 36 which in the usual manner engages the drill steel collar 37 to prevent axial withdrawal of the drill steel 38 when pivoted to occupy the position of FIGS. 1 and 2. Forwardly the drill steel 38 has the usual enlarged drill bit 39.

Figure 3:
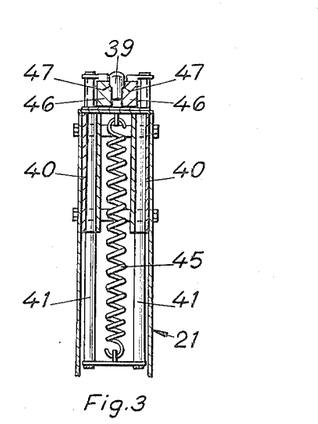
FIG. 3 is a sectional view of the drill centralizer mounting on line 3—3 in FIG. 1 with the drill centralizer in its retracted position.
Figure 4:
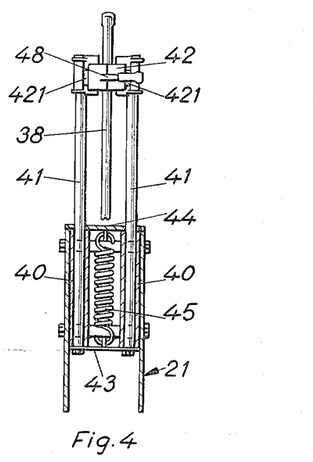
FIG. 4 is a view corresponding to FIG. 3 but showing the drill centralizer in its extended position.

At the front and inside of the shell 21 there are affixed parallel sleeves 40 slidably accommodating the supporting rods 41 of a drill centralizer 42. A transverse plate 43 is bolted to the inner ends of the rods 41. A front plate 44 is attached to the shell 21 extending between the angle irons 22. Between the plates 43, 44 there extends a helical draw spring 45 which forms a resilient means between the shell 21 and the drill centralizer 42 for urging the latter in the forward direction relative to the shell 21. The centralizer 42 includes a pair of conventional spaced guide arms 421 pivotally arranged on the centralizer body 42 and carrying guide jaws 46. When brought together to guiding position the jaws 46 form a cylindrical guide opening closely surrounding and supporting the drill steel 38. One of the jaws 46 carries pivotally thereon a locking bolt 48 which may be brought in engagement with the other jaw 46 for releasably locking the jaws in guiding position. Forwardly the guide opening has a widened portion defining shoulders 47 on the jaws 46, FIG. 3, against which the drill bit 39 abuts when the drill steel 38 is retracted rearwardly sufficiently to bring the bit in engagement with the guide jaws 46.

For displacing the rock drill 200 along the shell 21 and performing forward and backward feed movement there is provided a feed motor mechanism 50 slidable along the shell 21 on a slide 51. The slide 51, FIG. 12, has longitudinal opposed guideways 52 engaging the shell 21 and carries a forwardly directed U-shaped bracket 53, FIGS. 5 and 8, similar to the bracket 35 on the rock drill slide 33. Coaxial apertures 54a and 54b are provided centrally in the brackets 35, 53 respectively accommodating a bolt 55 carrying threadedly thereon a nut 56. The bolt projects to the rear from the bracket 35 and serves as a carrier for a pair of rubber buffers 57a, b provided at opposite sides of the bracket 53.

The buffers 57a, b are affixed to and extend between ends plates and are of cylindrical shape with a central hole for the bolt 55. By tightening the nut 56 the buffers 57a, b may be given a suitable compression providing an elastic means for transmitting feeding forces in either direction longitudinally of the shell 21 between the brackets 53 and 35, i.e., between the feeding mechanism 50 and the rock drill 200.

Centrally on the slide 51 there is provided a vertical bearing 59 in which a shaft 60 is rotatably journalled. Fixedly connected to the lower end of the shaft 60 is a gear 61 which is in constant engagement with the rack 25. To the upper end of the shaft there is keyed a cogwheel 62. For purposes of rotating the cogwheel 62 there are provided two separate pressure fluid driven motors on the slide 51, one, designated 63, for imparting forward feed movement to the slide 51 and the other, designated 64, for imparting rearward feed movement thereto. Although any other suitable motor type may be provided these motors preferably are compressed air driven reciprocating diaphragm motors to be described hereinafter, said motors being mounted tangentially to the cogwheel 62 and supported on the slide 51 in upstanding clamping brackets 58.

Each reciprocating diaphragm motor 63, 64 consists of two main frame members 65 and 66 which are tightly clamped together around the periphery of a circular reciprocable diaphragm 67. Centrally the diaphragm 67 is provided with an opening 68 around which is tightly affixed a plate 69 as by bolts. The frame members 65, 66 form an internal space divided by the diaphragm 67 and plate 69 in a working chamber 70 and a spring chamber 71. The frame member 66 is integral with a control valve casing 72 having a partition 73 therein adjacent to which there are formed opposed chambers 74 and 75. The chamber 74 communicates freely with the working chamber 70 via an opening 76 and is closed by a cover 77 tightly screwed against a seat in the valve casing 72.

From one side of the plate 69 there extends a bar 78 to the outside of the diaphragm motor which bar is slidably journalled for reciprocation in the frame member 65 on suitable bearings 79. A compression spring 80 in the spring chamber 71 is interposed between the frame member 65 and the plate 69 and tends to displace the diaphragm 67 to the position of FIG. 13.

The bar 78 carries a bracket 81 at its outer end on which a driving pawl 82 is pivoted on a pin 83. The pawls of the two diaphragm motors 63, 64 are designated 82a and 82b, respectively. A spring 84 is clamped to the bracket 81 and urges the pawl 82 to swing towards the cogwheel 62. The frame member 65 carries a forwardly protruding lug 86 which is engaged by an inner arm 85 on the pawl 82 when the bar 78 approaches the position of FIG. 13. This engagement swings the pawl 82 aside against the action of the spring 84 so that the pawl is disengaged from the cogwheel. This permits the cogwheel 62 to rotate freely but as soon as the bar 78 starts to move to the left from the position of FIG. 13, the pawl 82 again swings towards and engages the cogwheel 62 thereby moving it a certain step for each working stroke performed by the bar 78.

Figure 20:
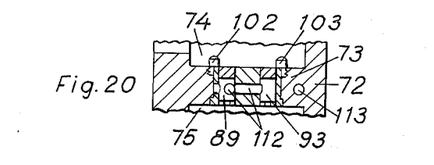
FIG. 20 is a sectional view on line 20—20 in FIG. 16.

A bearing member 88 is tightly received in a through opening in the partition 73 and is provided with axial passages 89–93 of which passages 90–92 are through passages leading to the chamber 74 while passages 89 and 93 are plugged tight, FIG. 20, at their ends adjacent said chamber. The chamber 75 is tightly closed by a screwed on cover 94 and accommodates a control valve 95. The valve 95, which is of circular shape and has a tight sliding fit against one end of the bearing member 88, is keyed to a shaft 96 pivotally journalled centrally in and extending through the bearing member 88. In the control valve 95 there are provided axial through openings 97, 98 for cooperation with the passages 90 and 91 of the bearing member 88 and a pair of partly circular grooves 99, 100, the latter for cooperation with the passages 89, 90 and 93, 92, respectively.

Oppositely to the control valve 95 the shaft 96 carries fixedly thereon an arm 101 swingably arranged to alternately abut against opposed lugs 102, 103 screwed in the partition 73. These lugs 102, 103 serve to define two distinct throw positions of the control valve as illustrated diagrammatically in FIGS. 17 and 19, respectively. A single helical draw spring 104 serves for keeping the arm 101 in the two alternative positions and is connected at one end to a pin 105 projecting into the chamber 74 from the swinging end of the arm 101. The opposite end of the spring 104 is supported on a pin 106 reciprocable in unison with the diaphragm 67. A valve throwing member 107 projects from the plate 69 centrally through the opening 68 of the diaphragm 67 through working chamber 70 and opening 76 into the chamber 74. Adjacent the arm 101 the member 107 has a notch therein forming opposed abutments 108, 109 and the pin 106 is affixed to the member 107 centrally with respect to the abutments 108, 109. A throwing pin 110 is provided in an intermediate position on the arm 101 and may for purposes of throwing the control valve 95 be engaged alternately by the abutments 108, 109.

The passages 89, 93 in the bearing member 88 are interconnected and in communication with the atmosphere via a passage 112 provided in the member 88 and valve casing 72. Pressure fluid for driving the diaphragm motor is supplied to the chamber 75 via a passage 113.

Figure 13:
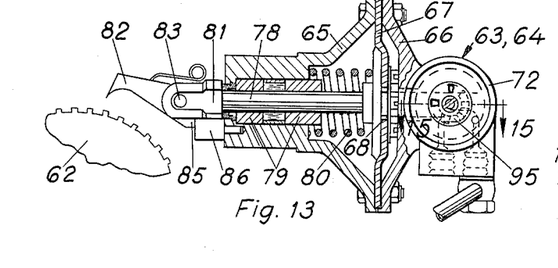
FIG. 13 is a longitudinal view of a reciprocating diaphragm motor included in the feeding motor mechanism of FIG. 5.
Figure 14:
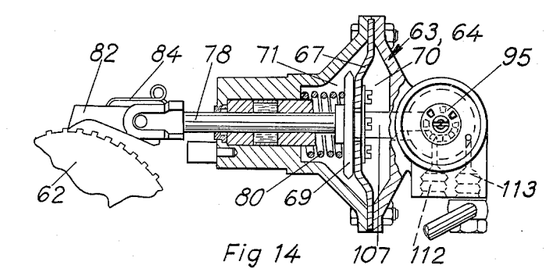
FIG. 14 shows the diaphragm motor in FIG. 13 in another position.
Figure 15:
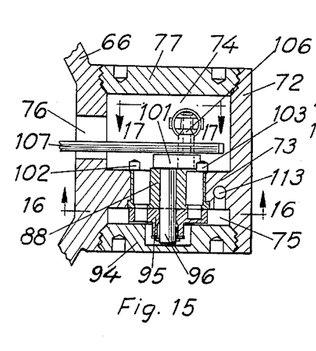
FIG. 15 is an enlarged sectional view substantially on line 15—15 in FIG. 13.
Figure 16:
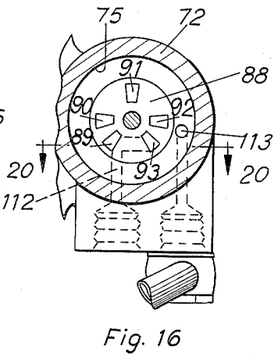
FIG. 16 is a view on line 16—16 in FIG. 15.

In FIGS. 13 and 14 the cover 94 has been removed from the valve casing 72 in order to show underlying parts. If compressed air in the position of the diaphragm motor of FIG. 13 and with the cover 94 in place is supplied to the passage 113, the chamber 75 will be pressurized. Since the control valve 95 occupies the position illustrated in FIG. 17 and the arm 101 accordingly is held against the lug 103 by the draw spring 104, compressed air will enter through the openings 97, 98 in the pilot valve 95 and the passages 90, 91 in the bearing member into the chamber 74 and thence through the opening 76 into the working chamber 70 of the diaphragm motor. Simultaneously the groove 100 will close the passage 92 leading from the chamber 74 while the groove 99 will be aligned with the passage 89 thereby closing access to the exhaust passage 112.

Figure 17:
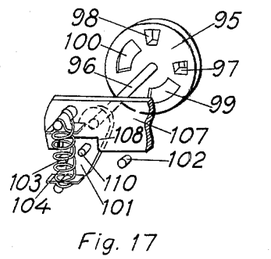
FIG. 17 is a perspective view of the control valve and the valve throwing mechanism seen in the direction of the arrows 17—17 in FIG. 15 with a diaphragm motor in the position of FIG. 13.
Figure 18:
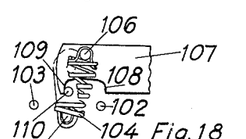
FIG. 18 is a plane fragmental view corresponding to FIG. 17 and showing the throwing mechanism in an intermediate position.

The pressure in the chamber 70 causes the diaphragm 67 to move to the position of FIG. 14 simultaneously moving the plate 69 to compress the spring 80, the bar 78 to perform a working stroke, and the throwing member 107 to throw the control valve 95. The throwing operation is depicted in FIGS. 17–19 and involves firstly movement of the abutment 109 on the throwing member 107 into engagement with the pin 110 on the arm 101, then continued movement of said abutment 109 and pin 110 in unison to approximately the position of FIG. 18 in which the draw spring has just passed an intermediate dead center position, whereupon finally the draw spring rapidly and in advance of the moving abutment 109 swings the arm 101 to the opposite throw position into abutting relation with the pin 102, FIG. 19.

Figure 19:
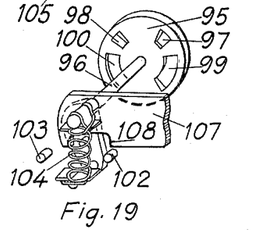
FIG. 19 is a perspective view illustrating the valve and its throwing mechanism in a position corresponding to FIG. 14.

In the position of FIGS. 14 and 19 the openings 97, 98 in the control valve 95 will be out of register with the passages 90, 91 whereby communication between the chambers 75 and 74 will be interrupted. On the other hand the grooves 99, 100 will now establish communication between the passages 90, 92 and the respective passages 89, 93, thereby connecting the working chamber 70 to the atmosphere via the exhaust passage 112. Pressure relief in the working chamber 70 gives the spring 80 freedom to expand and to return the diaphragm to the position of FIG. 13 while the bar 78 is urged to produce a return stroke and the throwing member 107 by means of the abutment 108 is urged to swing the arm 101 and to throw the control valve 95 from the position of FIG. 19 to the position of FIG. 17 reversely to the order described above.

Figure 11:
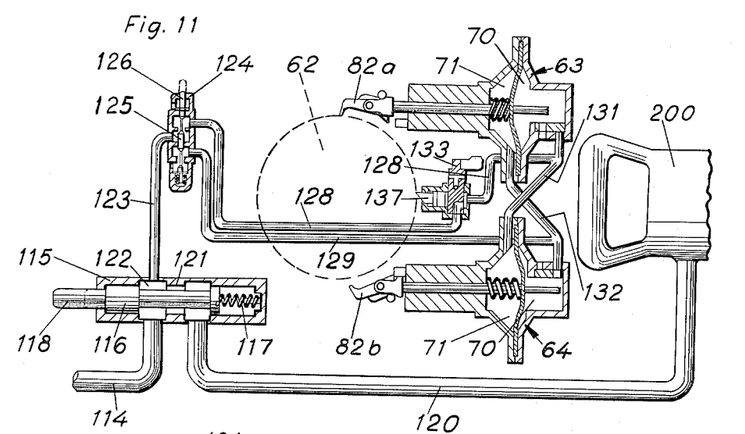
FIG. 11 is a diagrammatic pressure fluid circuitry for the feeding motor mechanism.

A supply valve 115 is fixedly connected to the rear of the slide 51 by means of a pair of clamps 111 and extends longitudinally of the feeding motor mechanism 50. A supply hose 114 for compressed air is connected to the valve 115 via a swivel member 119. In the supply valve 115 there is provided a slidable valve body 116 and a biasing spring 117, FIG. 11, which urges the valve body 116 to the position illustrated in FIGS. 5 and 11. In such position a stem 118 on the body 116 protrudes to the rear from the valve 115 and a communication is established via the supply valve 115 between the hose 114 and a conduit 120 to the rock drill 200 so that compressed air may be supplied to drive the rock drill. Depression of the stem 118 defines another position of the supply valve 115 in which the valve body 116 is received in an apertured partition 121 thereby tightly closing the communication to the conduit 120 so that the rock drill is stopped.

An annular chamber 122 is provided adjacent the partition 121 for establishing constant communication between the hose 114 and a conduit 123 leading to a reversing valve 124. Slidably arranged in the reversing valve 124 is a valve body 125 urged by a biasing spring 127 to project a button 126 to the outside of the reversing valve. The valve body 125 is capable of occupying two distinct positions, a forward feed position with the button 126 depressed, in which pressure fluid from the conduit 123 is directed by grooves on the body 125 to a conduit 128 leading via a reduction valve 133 to the diaphragm motor 63, and a backward feed position with the button in its protruding position, for directing pressure fluid from the conduit 123 to a conduit 129 leading to the diaphragm motor 64. The arrangement is such, that while compressed air is directed to one of the conduits 128, 129 the other of said conduits is vented by grooves in the valve body 125 to the atmosphere via one of a pair of exhaust openings 130.

In order to perform, subsequetnly to shifting of the reversing valve 124, a rapid retraction and keeping in retracted position of the pawl 82 of the diaphragm motor which by the shifting has been connected to one of the exhaust openings 130, there are provided cross conduits 131, 132 between each conduit 128, 129 and the spring chamber 71 of the other diaphragm motor. This guarantees that the driving pawl 82 of the diaphragm motor to be set idle is always retracted before the pawl 82 of the other motor starts its working stroke. A conventional pressure reduction valve is coupled in the conduit 128 and is provided with a lever 134 by which the pressure for actuating the diaphragm motor 63 for forward feed may be adjusted.

Adjacent the pressure reduction valve 133 there is provided a small cylinder 135 which receives compressed air from the valve 133 and slidably accommodates a plunger 136 with an outwardly projecting detent. A spring 149 is inserted between a forward shoulder on the plunger 136 and the cylinder 135 for urging the plunger in a direction opposite that of the compressed air and the detent inwardly into the cylinder. As soon as the conduit 128 is pressurized, however, the plunger will be urged by pressure fluid in the outward direction against the spring action engaging by means of a detent 137 the periphery of the cogwheel. The detent 137 and the plunger 136 form a one-way slip device which during operation of the drill 200 and forward feed thereof prevents rotation of the cogwheel 62 in the backward feed direction. Thereby movement of the slides 51 and 33 away from the rock face is prevented while a feeding pressure is maintained by constant compression of the buffer 57a between the slides 51 and 53. As soon as the conduit 128 is vented the plunger 136 together with the detent 137 will be retracted by the spring 149 giving the cogwheel 62 freedom to rotate in the direction in which backward feed is performed.

The reversing valve 124 is mounted transversely on the slide 51. Adjacent its button 126 there are provided means on the slide 51 for locking and keeping the valve body 125 depressed against the bias of the spring 127. These means in cooperation with said spring 127 also form shifting means for the valve body 125. Accordingly, there is provided on an upstanding pivot 138 on the slide 51 a swingable transverse lever 139 having a notch 140. On another pivot 141 there is provided a second swingable lever 142 extending longitudinally of the slide 51 and cooperating with the button 126 of the valve body 125. The outer end of the lever 142 is capable of being engaged by the notch 140 on the lever 139, FIG. 5, and in such position the button 126 and valve body 125 are kept depressed and locked in the forward feed position. A spring-pressed plunger 144 coacts with the back of the lever 139 for keeping the notch 140 in engagement with the lever 142. The outer end of the lever 139 may be brought in engagement with a cam plate 145 connected to one side forwardly on the shell 21 as by a bolt 146. The cam plate 145 may be adjusted longitudinally of the shell 21 for which purpose there is provided a slit 147 therein through which the bolt 146 passes and there may also be provided spaced alternative holes 143 for the bolt 146 along the shell 21. When engaged by the cam plate 145 the lever 139 moves against the action of the plunger 144 until the notch 140 is displaced beyond the outer end of the lever 142, whereupon the spring 127 presses the valve body 125, the button 126, and the lever 142 outwardly shifting the reversing valve 124 to backward feed position. An operating member 148 is connected to the lever 142 so that the button 126 may be depressed at will and, provided the cam plate is out of contact with the lever 139, such depression will produce locking of the lever 142 in depressed position thanks to the notch 140.

Rearwardly on the slide 51 there is bolted a plate 150 projecting downwardly centrally between the irons 22 of the shell 21. On the shell 21 there is affixed a rear transverse pin 151 againast which the plate 150 may be brought into abutting relation for defining a rear position of the feeding motor mechanism 50 on the shell 21. The feeding motor mechanism 50 may be protected by a suitable formed cover 155.

For cooperation with the rearwardly protruding stem 118 of the supply valve body 116 there is mounted by means of a bolt 154 a longitudinally adjustable abutment plate 153 rearwardly on the shell 21. The plate 153 is positioned relative to the transverse pin 151 in a manner to be capable of fully depressing the stem 118 when the plate 150 abuts the transverse pin 151.

In operation, let it be assumed that the hose 114 is connected to a source of compressed air, not shown, and that the feeding motor mechanism 50 occupies a rear position on the horizontally supported shell 21 with the plate 150 abutting the rear pin 151. In such rear position the abutment plate 153 keeps the stem 118 of the supply valve body 116 depressed and the opening in the partition 121 closed thereby preventing operation of the rock drill 200. The reversing valve 124 and its cooperating parts are in the position illustrated in FIG. 6, and compressed air is thus directed from the constantly pressurized conduit 123 via the conduit 129 to the working chamber 70 of the diaphragm motor 64. This urges the bar 78 outwardly to exert via the pawl 82b a holding torque on the cogwheel 62 which is transmitted over the shaft 60 to the gear 61. Through its engagement with the fixed rack 25 the gear 61 forces the slide 51 and the plate 150 against the rear pin 151 and resists over the rock drill 200, the retainer 36, the drill steel 38 and the drill bit 39, extension of the drill steel centralizer 42 under the action of its draw spring 45. Simultaneously the spring chamber 71 of the diaphragm motor 63 receives air via the cross conduit 132 whereby the pawl 82a is kept out of engagement with the cogwheel 62.

For starting forward feed of the rock drill 200 and feeding motor mechanism 50 as a single unit the operator has to depress the operating member 148. Such depression brings the lever 142 into the locked position of FIG. 5 whereby the reversing valve 124, with its button 126 depressed, is shifted into the forward feed position. Compressed air is now directed from the conduit 123 to the conduit 128, the reduction valve 133, and the diaphragm motor 63 as well as to the spring chamber 71 of the diaphragm motor 64. Simultaneously therewith the conduit 129 and the spring chamber 71 of the diaphragm motor 63 are vented via one of the exhaust openings 130. As a result, the pawl 82b is immediately fully retracted away from the cogwheel 62 while the pawl 82a starts reciprocation and stepwise rotation of the cogwheel 62. The air in the reduction valve 133 moves the plungers 136 outwardly and brings the detent 137 in engagement with the cogwheel 62. The rotation of the cogwheel 62 is transmitted via the shaft 60 to the gear 61 which rolls along the rack 25 producing a sliding forward motion of the feeding motor mechanism 50 and the rock drill 200. To begin with, the stem 118 of the supply valve 115 because of its spring bias remains stationary in contact with the abutment plate 153. Thereafter, the aperture in the partition 121 will be opened by reason of the forward feed whereupon compressed air can pass to the conduit 120 to start operation of the rock drill 200. Forward feed of the drill bit 39 allows extension of the drill centralizer 42 under the action of the draw spring 45 to the feel length or until the rock face is contacted, whereupon the hole can be started with the centralizer effectively guiding the drill steel 38. Thereupon feeding and drilling will continue until the hole has been drilled to the desired depth. During starting and drilling of the hole the buffer 57a will receive a constant uniform compression to which a certain additional compression is added each time the pawl 82a performs a working stroke. The constant compression will be susbtantially maintained also during the return stroke of the pawl 82a during which the additional compression is used up for providing forward feed movement while the detent 137 prevents reverse rotation of the cogwheel 62. Thus a suitable substantially uniform bit pressure will be maintained and the level of the bit pressure may be adjusted by varying the pressure in the conduit 128 by means of the reduction valve 133.

The depth drilled is defined by the position of the cam plate 145 which at the proper moment contacts the lever 139 thereby automatically causing shifting of the reversing valve 124. The forward feed causes turning of the arrested lever 139 and the notch 140 is thus turned away from the lever 142, whereupon the spring 127 will shift the valve body 125 to its backward feed position, FIG. 6. The conduit 128 will now be exhausted via one of the exhaust passages 130 so that the detent 137 can be retracted by its spring 149 and the spring chamber 71 of the diaphragm motor 64 can be emptied via the cross conduit 131. On the other hand compressed air will be conducted from the conduit 123 to the conduit 129 pressurizing via the cross conduit 132 the spring chamber 71 of the diaphragm motor 63 and starting reciprocation of the pawl 82b. The pressure in the spring chamber 71 of the diaphragm motor 63 produces immediate retraction of the pawl 82a. During reciprocation of the pawl 82b the cogwheel 62 is rotated in the reverse direction to produce backward feed movement of the feeding motor mechanism 50 in unison with the rock drill 200 under the necessary compression of the buffer 57b. With the feeding mechanism 50 approaching its rear position on the shell 21 the drill bit 39 will eventually engage the abutments 47 on the drill centralizer 42 and will cause retraction of the drill centralizer in unison with the feeding mechanism 50 against the action of the draw spring 45. If use of a comparatively weak draw spring 45 is envisaged the friction between the slides 33, 51 and the shell 21 and the inertial forces will usually be sufficient to prevent extension of the drill centralizer each time the pawl 82b performs its return stroke. As an alternative suitable for use together with a strong draw spring 45 or for performing backward feed against considerable resistance there may be provided a plunger and detent arrangement digrammatically indicated at 156, FIG. 5, and forming a one-way slip device in full analogy with the arrangement of the detent 137, but modified, of course, to slip in the reverse direction of rotation of the cogwheel as compared to the detent 137 and to receive air from the conduit 129.

Just prior to termination of the backward feed movement the stem 118 of the supply valve body 116 will be arrested by the abutment plate 153 and while the feeding motor mechanism 50 continues to its rear position the supply valve body 116 will close the aperture in the partition 121 thereby interrupting the the supply of compressed air to the rock drill 200. The backward feed movement comes to an end as soon as the plate 150 contacts the transverse pin 151. After displacement of the shell 21 to a new position the next automatic drilling cycle may be started by depression of the operating member 148.

Thus it is seen that by the sole actuation of the operating member 148 there is performed in succession and automatically: starting of the forward feed and of the rock drill, extension of the drill centralizer, production of a hole of the desired depth, backward feed of the rock drill, retraction of the centralizer, and interruption of the rock drill operation.

As readily seen the depth of the drill hole produced may easily be adjusted through adjustment of the longitudinal position of the cam plate 145 on the shell 21.

The embodiment of the invention above described and illustrated in the drawings should only be considered as an example and the invention may be modified within the scope of the following claims.

What I claim is:

1. In an automatic feeding device for feeding rock drills toward and away from a surface to be drilled and having an elognated feed shell with guiding means and a rack extending longitudinally thereof, and a source of pressure fluid, the combination which comprises a feeding motor mechanism for connection with a rock drill and slidable on said guiding means, said mechanism including a rotatable gear in meshing engagement with said rack and having a cogwheel drive coupled therewith, a first pressure fluid driven reciprocating diaphragm motor, a first driving pawl connected to and driven by said first diaphragm motor for intermittently engaging the spokes of said cogwheel for the rotation thereof and with said gear coupled therewith to impart forward feed movement to said mechanism along said guiding means, a second pressure fluid driven reciprocating diaphragm motor, a second driving pawl connected to and driven by said second diaphragm motor for intermittently engaging the spokes of said cogwheel for the rotation thereof and with said gear coupled therewith to impart rearward movement to said mechanism along said guiding means, a supply line for supplying pressure fluid from said source to said apparatus, a reversing valve disposed in said supply line between said source and said diaphragm motors and shiftable between a forward and a backward feed position for directing pressure fluid from said supply line selectively to said first and said second diaphragm motors, shifting means connected to said reversing valve, a longitudinally adjustable forward abutment disposed on said shell and in the path of forward movement of said shifting means for the engagement thereof for shifting said reversing valve from said forward to said backward feed position upon engagement of said abutment, means for arresting said mechanism with said rock drill attached in the rear position thereof on said shell after the said backward feed thereof, and an operating member connected to said shifting means for the manual operation thereof for shifting said reversing valve from said backward to said forward feed position.

2. An automatic feeding device for rock drills as set forth in claim 1 and including a fluid passage between said supply line and said rock drill, a supply valve in said passage and having an opening bias and being shiftable between open and closed position for controlling the pressure fluid supply to said rock drill, and a rear abutment on said shell disposed in the path of feeding movement of said supply valve for shifting said supply valve against said opening bias from said open to said closed position at the end of said backward feed movement.

3. An automatic feeding device for rock drills as set forth in claim 1 and including a drill centralizer longitudinally slidably carried at the forward end of said shell for engaging the drill steel of said rock drill, resilient means between said shell and said centralizer for urging said disposed centralizer and connected thereto in a forward direction relative to said shell, and means in said centralizer for engaging the end of said drill steel and capable of retracting said centralizer against the action of said resilient means at the end of said backward feed movement.

4. An automatic feeding device for rock drills comprising an elongated shell, guiding means including gear and rack means extending longitudinally of said shell, a pressure fluid driven rock drill and a feeding motor mechanism slidable in unison on said guiding means, a first pressure fluid driven motor included in said mechanism and connected to said gear and rack means for displacing said mechanism in a direction to impart forward feed movement to said rock drill along said guiding means, a second pressure fluid driven motor included in said mechanism and connected to said gear and rack means for displacing said mechanism in a direction to impart backward feed movement to said rock drill along said guiding means, a supply line for supplying pressure fluid to said mechanism, a reversing valve in said supply line, said reversing valve shiftable between forward and backward feed position for directing pressure fluid from said supply line to said first and said second motor, respectively, shifting means connected to said reversing valve, a longitudinally adjustable forward abutment on said shell in the path of feeding movement of said shifting means for engaging said shifting means and shifting said reversing valve from said forward to said backward feed position upon engagement of said forward abutment, and an operating member connected to said shifting means for manual operation thereof for shifting said reversing valve from said backward to said forward feed position.

5. An automatic feeding device for rock drills as set forth in claim 5 and including a fluid passage between said supply line and said rock drill, a supply valve in said passage, said supply valve having an opening bias and being shiftable between open and closed position for controlling the pressure fluid supply to said rock drill, and a rear abutment on said shell disposed in the path of feeding movement of said supply valve for shifting said supply valve against said opening bias from said open to said closed position at the end of said backward feed movement.

6. An automatic feeding device for rock drills having an elongated shell with guiding means extending longitudinally thereof, a pressure fluid driven rock drill, a pressure fluid driven feeding motor mechanism connected to said rock drill for imparting forward and backward feed movement thereto, and a source of pressure fluid, the combination which comprises a supply line providing flow communication between said source of pressure fluid and said rock drill and having a supply valve disposed therein, said supply valve having an opening bias and being shiftable between an open and a closed position for controlling the pressure fluid supply to said rock drill, a secondary supply line in flow communication with said source of pressure fluid and said feeding motor mechanism and having a reversing valve disposed therein, said reversing valve being shiftable between a forward and a backward feed position for controlling the direction of feed of said feeding motor mechanism, shifting means connected to said reversing valve for the operation thereof, a forward abutment on said shell in the path of the feeding movement of said shifting means for the engagement thereof for shifting said reversing valve from said forward to said backward feed position, a rear abutment on said shell in the path of movement of said supply valve for moving said supply valve against said opening bias from said open to said closed position, and an operating member connected to said shifting means for shifting said reversing valve from said backward to said forward feed position.

7. An automatic feeding device as set forth in claim 6 and including a valve body in said reversing valve slidable between said forward and said backward feed position, means for biasing said valve body to said backward feed position, releasable locking means for locking said valve body in said forward feed position against the action of said biasing means and adjacent said forward abutment for being released thereby.

8. An automatic feeding device as set forth in claim 6 in which said forward abutment is provided with means for selectively adjusting the longitudinal position thereof on said shell.

9. A feeding device for rock drills having an elongated shell with guiding means and a rack extending longitudinally thereof and, a pressure fluid driven rock drill, the combination which comprises a feeding motor mechanism slidable in unison with said rock drill on said guiding means, said mechanism including a rotatable gear in meshing engagement with said rack and a cogwheel drive-coupled with said gear, a first pressure fluid driven reciprocating diaphragm motor and a first driving pawl connected thereto for intermittent engagement with said cogwheel for the rotation thereof in a direction to impart forward feed movement to said rock drill along said guiding means, a second pressure fluid driven reciprocating diaphragm motor and a second driving pawl connected thereto for intermittent engagement with said cogwheel for the rotation thereof in a direction to impart backward feed movement to said rock drill along said guiding means, means for supplying pressure fluid successively to each said motor, first pressure fluid actuated means in the said supply means to said first motor and responsive to pressure fluid supply therein for disengaging the driving pawl of the said second motor from said cogwheel, and second pressure fluid actuating means in said supply means to said second motor and responsive to pressure fluid supply therein for disengaging the driving pawl of the said first motor from said cogwheel.

10. A feeding device for rock drills having an elongated shell with guiding means and a rack extending longitudinally thereof and, a pressure fluid driven rock drill, the combination which comprises a feeding motor mechanism slidable with said rock drill on said guiding means, said mechanism including a rotatable gear in meshing engagement with said rack and a cogwheel drive-coupled with said gear, a first pressure fluid driven reciprocating diaphragm motor and a first driving pawl connected thereto for intermittent engagement with said cogwheel for the rotation thereof in a direction to impart forward feed movement to said rock drill along said guiding means, a second pressure fluid driven reciprocating diaphragm motor and a second driving pawl connected thereto for intermittent engagement with said cogwheel for the rotation thereof in a direction to impart backward feed movement to said rock drill along said guiding means, a one-way slip device in cooperative engagement with said cogwheel and arranged to slip during rotation of said cogwheel in said forward feed direction and to prevent rotation thereof in the opposite direction, means for supplying pressure fluid successively to each said motor, first pressure fluid actuated means in said supply means to said first motor and responsive to pressure fluid supply therein for disengaging the driving pawl of the second motor from said cogwheel, and second pressure fluid actuated means in said supply means and connected to said one-way slip device and responsive to the said pressure fluid supply to said second motor for disengaging said one-way slip device from said cogwheel.

11. An apparatus for feeding rock drills toward and away from a surface to be drilled and having an elongated shell with guiding means and a rack extending longitudinally thereof, a pressure fluid driven rock drill, and a source of pressure fluid, the combination which comprises a feeding motor mechanism connected to said rock drill and slidable in unison therewith on said guiding means, said mechanism including a rotatable gear in meshing engagement with said rack and having a cogwheel drive coupled therewith, a pressure fluid driven reciprocating diaphragm motor, a driving pawl connected to and driven by said diaphragm motor for intermittently engaging the spokes of said cogwheel for the rotation thereof and said gear coupled therewith to impart feeding movement to said rock drill along said guiding means, a supply line from said source for supplying pressure fluid to said apparatus, a reversing valve disposed in said supply line between said source of pressure fluid and said diaphragm motor and shiftable between a forward and a backward feed position for directing pressure fluid from said supply line to said diaphragm motor, shifting means connected to said reversing valve, a longitudinally adjustable forward abutment disposed on said shell and in the path of the forward movement of said shifting means for the engagement thereof for shifting said reversing valve from said forward to said backward feed position upon engagement of said abutment, means for arresting said mechanism with said rock drill attached in the rear position thereof on said shell after the said backward feed thereof, and an operating member connected to said shifting means for the manual operation thereof for shifting said reversing valve from said backward to said forward feed position.

12. An automatic apparatus for feeding rock drills toward and away from a surface to be drilled and having an elongated shell with guiding means and a rack extending longitudinally thereof, a pressure fluid driven rock drill and a source of pressure fluid, the combination which comprises a feeding motor mechanism connected to said rock drill and slidable in unison therewith on said guiding means, said mechanism including a rotatable gear in meshing engagement with said rack and having a cogwheel drive-coupled therewith, a pressure fluid driven reciprocating diaphragm motor, a driving pawl connected to and driven by said diaphragm motor for intermittently engaging the spokes of said cogwheel for the rotation thereof and said gear coupled therewith to impart feed movement to said rock drill along said guiding means, a one-way slip device in cooperative engagement with said cogwheel and arranged to slip during rotation of said cogwheel in said forward feed direction and to prevent rotation thereof in the opposite direction, a supply line connected to said source for supplying pressure fluid to said apparatus, a reversing valve disposed in said supply line between said source of pressure fluid and said diaphragm motor and shiftable between a forward and a backward feed position for directing pressure fluid from said supply line to said diaphragm motor, shifting means connected to said reversing valve, a longitudinally adjustable forward abutment disposed on said shell and in the path of the forward movement of said shifting means for the engagement thereof for shifting said reversing valve from said forward to said backward feed position upon engagement of said abutment, pressure fluid actuated means in said supply line and in flow communication with said one-way slip device for disengaging said one-way slip device from said cogwheel in said backward feed position, means for arresting said mechanism with said rock drill attached in the rear position thereof on said shell after the said backward feed thereof, and an operating member connected to said shifting means for manual operation thereof for shifting said reversing valve from said backward to said forward feed position.

13. An automatic feeding device for feeding rock drills toward and away from a surface to be drilled and having an elongated feeding shell with guiding means and a rack extending longitudinally thereof, a pressure fluid driven rock drill, and a source of pressure fluid, the combination which comprises a feeding motor mechanism connected to said rock drill and slidable in unison therewith on said guiding means, said mechanism including a rotatable gear in meshing engagement with said rack and having a cogwheel drive coupled therewith, a first pressure fluid driven reciprocating diaphragm motor, a first driving pawl connected to and driven by said first diaphragm motor for intermittently engaging the spokes of said cogwheel for the rotation thereof and said gear coupled therewith to impart forward feed movement to said rock drill along said guiding means, a second pressure fluid driven reciprocating diaphragm motor, a second driving pawl connected to and driven by said second diaphragm motor for intermittently engaging the spokes of said cogwheel for the rotation thereof and said gear coupled therewith to impart backward feed movement to said drill along said guiding means, a supply line for supplying pressure fluid from said source to said apparatus, a reversing valve disposed in said supply line between said source and said diaphragm motors and shiftable between a forward and a backward feed position for directing pressure fluid from said supply line to said first and second diaphragm motors, respectively, a one-way slip device in cooperative engagement with said cogwheel and arranged to slip during rotation of said cogwheel in said forward feed direction and to engage said cogwheel and to prevent rotation thereof in said backward feed direction, shifting means connected to said reversing valve, a longitudinally adjustable forward abutment disposed on said shell and in the path of the forward movement of said shifting means for the engagement thereof for shifting said reversing valve from said forward to said backward feed direction upon engagement of said abutment, a pressure fluid actuated means in flow communication with said pressure fluid supplied to said second motor and said one-way slip device for disengaging said one-way slip device from said cogwheel, means for arresting said mechanism with said rock drill attached in the rear position thereof on said shell after the said backward feed thereof, and an operating member connected to said shifting means for the manual operation thereof for shifting said reversing valve from said backward to said forward feed position.

14. An automatic feeding device for feeding rock drills toward and away from a surface to be drilled and having an elongated shell with guiding means extending longitudinally thereof, and a pressure fluid driven feeding mechanism, the combination which comprises a pair of intercoupled slides mounted for sliding reciprocation in unison on said guiding means, with the forward one of said slides for placement of a rock drill thereon and the feeding mechanism on the rear slide, said feeding motor mechanism being in engagement with said shell for imparting forward and backward feed movement to said slides along said guiding means, a source of pressure fluid, a reversing valve in said source of pressure fluid and in flow communication with said feeding motor mechanism and shiftable between a forward and a rearward position for controlling the direction of feed thereof, a biasing means in said reversing valve for the biasing thereof in said backward feed position, automatic latching means for latching said reversing valve against said biasing means in said forward feed position, a longitudinally adjustable abutment at a selected forward position on said shell and in the path of feeding movement of said latching means for engagement therewith for unlatching said reversing valve whereby said reversing valve is moved by said biasing means from said forward to said backward feed position, a positive stop on said shell cooperating with said rear slide for the arresting thereof in the furthest rear feed position on said shell, and an operating member connected to said automatic latching means for shifting said reversing valve from said backward to said forward feed position whereby said reversing valve is latched for the next automatic drilling cycle.

15. An automatic feeding device as set forth in claim 14 which includes a releasable connection between said slides, with said connection including elastically compressible means between said feeding motor mechanism and a rock drill placed in the said device for compression during transmission of feeding and reaction forces therebetween.

References Cited by the Examiner

UNITED STATES PATENTS

| | | | |
|---|---|---|---|
| 1,425,613 | 8/22 | Stage | 173—4 |
| 2,203,954 | 6/40 | Feucht | 173—158 |
| 2,303,872 | 12/42 | Willows | 91—341 |
| 2,350,660 | 6/44 | Curtis | 308—3.9 |
| 2,828,109 | 3/58 | Dellner | 308—3.9 |

BROUGHTON G. DURHAM, *Primary Examiner.*